(12) United States Patent
Johan (10) Patent No.: US 9,326,139 B2
(45) Date of Patent: Apr. 26, 2016

(54) SYSTEM AND METHOD FOR DELEGATED AUTHENTICATION AND AUTHORIZATION

(71) Applicant: Tele2 Sverige AB, Kista (SE)

(72) Inventor: Bolin Johan, Kista (SE)

(73) Assignee: Tele2 Sverige AB, Kista (SE)

( * ) Notice: Subject to any disclaimer, the term of this patent is extended or adjusted under 35 U.S.C. 154(b) by 0 days.

(21) Appl. No.: 13/720,726

(22) Filed: Dec. 19, 2012

(65) Prior Publication Data
US 2014/0024341 A1 Jan. 23, 2014

(30) Foreign Application Priority Data
Jul. 17, 2012 (EP) .................................... 12176742

(51) Int. Cl.
| | |
|---|---|
| H04M 1/66 | (2006.01) |
| H04W 12/06 | (2009.01) |
| H04N 21/2343 | (2011.01) |
| H04N 21/258 | (2011.01) |
| H04N 21/41 | (2011.01) |
| H04N 21/436 | (2011.01) |

(Continued)

(52) U.S. Cl.
CPC ........... *H04W 12/06* (2013.01); *H04L 63/0884* (2013.01); *H04L 63/18* (2013.01); *H04N 21/2343* (2013.01); *H04N 21/25875* (2013.01); *H04N 21/4126* (2013.01); *H04N 21/43615* (2013.01); *H04N 21/441* (2013.01); *H04N 21/6582* (2013.01); *H04L 63/0853* (2013.01)

(58) Field of Classification Search
CPC ........... H04L 63/0853; H04L 63/0884; H04N 21/25875; H04W 12/06
USPC ......................................................... 455/411
See application file for complete search history.

(56) References Cited

U.S. PATENT DOCUMENTS

| | | | |
|---|---|---|---|
| 6,421,768 B1* | 7/2002 | Purpura | 711/164 |
| 2003/0028763 A1* | 2/2003 | Malinen et al. | 713/155 |

(Continued)

FOREIGN PATENT DOCUMENTS

| | | |
|---|---|---|
| WO | WO 2008/113827 A2 | 9/2008 |
| WO | WO 2009/088132 A1 | 7/2009 |

OTHER PUBLICATIONS

EP Search Report for EP Application No. 12176742.0-1244, dated Dec. 3, 2012, pp. 1-8.

*Primary Examiner* — Timothy Pham
(74) *Attorney, Agent, or Firm* — Wolf, Greenfield & Sacks, P.C.

(57) ABSTRACT

The present invention provides a method for providing services to a presentation device. The method comprises detecting a service delivery module in a communication system using a communication device and performing an authentication and authorization session between the service delivery module and the communication device, wherein user authentication and authorization is created. The method further comprises connecting to a service information module in said communication system to access services; providing a service request from said communication device to said service information module and initiating a service delivery session with said service information module using said user authentication and authorization information and said service request. Moreover, the method comprises delivering at least one service to said presentation device based on said service request. The present invention further provides a communication system for providing at least one service to a presentation device.

28 Claims, 4 Drawing Sheets

(51) Int. Cl.
  *H04N 21/441* (2011.01)
  *H04N 21/658* (2011.01)
  *H04L 29/06* (2006.01)

(56) References Cited

U.S. PATENT DOCUMENTS

2006/0090076 A1* 4/2006 De Cnodder et al. ......... 713/182
2009/0240941 A1* 9/2009 Lee et al. ...................... 713/169
2010/0135491 A1* 6/2010 Bhuyan ......................... 380/247
2011/0023131 A1* 1/2011 Hjelm et al. .................... 726/29
2011/0176524 A1 7/2011 Fasbender et al.
2011/0209188 A1 8/2011 Petersson et al.
2011/0225643 A1 9/2011 Faynberg et al.
2012/0042160 A1* 2/2012 Nakhjiri et al. ............... 713/151
2013/0084828 A1* 4/2013 Forte ............................. 455/410

* cited by examiner

SYSTEM AND METHOD FOR DELEGATED AUTHENTICATION AND AUTHORIZATION

TECHNICAL FIELD OF THE INVENTION

The present invention relates to a method and system for mobile phone based delegated authentication and authorization for service delivery.

BACKGROUND ART

Services on the internet may be accessed from various devices, such as computers, mobile phones and televisions, such as in smart TV and IPTV technology. As an example, Video on Demand (VOD) or Audio and Video on Demand (AVOD) services allow users to select and watch/listen to video or audio content when the user has a demand or need to consume the service. IPTV or Internet TV technology may then be used to bring video on demand to televisions and personal computers. Television VOD systems may stream the content, thereby allowing viewing in real time, or they may allow download the video or audio content to e.g. a computer or portable media player for viewing at any time.

Accessed services typically use authenticate and authorize of a user by means of log-in, e.g. using a specific username and password for each user, and connect this log-in to billing mechanisms such as credit cards.

However, this inter alia requires storing of credentials in several devices (TV:s, computers etc) for auto-log, which may be a security issue and a lot of identification information (usernames, passwords) to keep track of. Further, existing solutions often require credit card numbers to be entered and stored in service provider's databases.

Moreover, hand-over of an ongoing session between platforms and networks may be a problem, especially if the networks are open and if the presentation devices used for rendering the services are not integrated with the same accounting and service delivery platforms. Thus, it may be difficult to re-route traffic in a service flow between different presentation devices, peers, without further authentication and authorization information from the user as the session is anchored between the server a peer. Further, at handover between e.g. a TV and a mobile phone, it may also be difficult to seamlessly re-adapt the service in terms of e.g. bit rate and properties of the media content (resolution etc).

In addition to video and audio services (streaming, progressive download or download) there is a range of other services also suffering from inconvenient authentication and authorization. Example services are storage services, web pages requiring log in, surveillance services and communication services.

Thus, there is a need in the art for improved systems and methods for providing internet and so called Cloud services to a user in an efficient and user-friendly way facilitating the user to consume services across different presentation platforms, but still with high level of integrity and security.

SUMMARY OF THE INVENTION

It is an object of the present invention to provide a system and method for communication device, such as a mobile phone, based delegated authentication and authorization for service delivery.

As a first aspect of the invention, there is provided a method for providing services to a presentation device, the method comprising detecting a service delivery module in a communication system using a communication device;
 performing an authentication and authorization session between the service delivery module and the communication device, wherein user authentication and authorization is created;
 connecting to a service information module in the communication system to access services;
 providing a service request from the communication device to the service information module;
 initiating a service delivery session with the service information module using the user authentication and authorization information and the service request; and
 delivering at least one service to the presentation device based on the service request.

According to another aspect of the present invention, there is provided a system for providing at least one service to a presentation device via a communication system. The system comprises a service delivery module configured to initiate an authentication and authorization session with a communication device and to initiate a service session with a service information module and a service information module comprising the at least one service and being configured to deliver the service to at least one presentation device configured to consume or render the service.

According to another aspect of the present invention, there is provided a method for provided services in a system including a service control client that is authenticated and authorized of one or multiple services from the service provider, typically being implemented in a communication device e.g. a SIM authenticated mobile device, the method comprising:

the service control client detecting a service delivery module in a communication system using a communication device;
 performing an authentication and authorization session between the service delivery module and the communication device, wherein user authentication and authorization is created;
 the service control client in a communication device connecting to a service information module in the communication system to access services;
 providing a service request from the communication device to the service information module;
 the service information module generating a unique service or session and user key and provide this to the communication device and service control client using authenticated and secure means
 the service control client retrieving the key form the service information module and sending the key, and possibly additional user or presentation relevant information, to a authenticated and selected service delivery module
 service delivery module initiating a service delivery session with the service information module using the user authentication and authorization information and key and the service request; and
 delivering at least one service to the presentation device based on the service request.

According to a further aspect of the present invention, there is provided a system for providing at least one service to a presentation device via a communication system. The system comprises a service delivery module configured to initiate an authentication and authorization session with a communication device and to initiate a service session with a service information module and service information module comprising the at least one service and being configured to deliver the service to at least one presentation device configured to consume or render the service.

According to a specific aspect of the present invention, there is provided system including a communication device configured to comprise a service control client that is authenticated and authorized of one or multiple services from the service provider and configured to detect the service delivery module using the service control client, wherein an authentication and authorization session between the service delivery module and the communication device, wherein user authentication and authorization is created, is performed. Further, the service control client being configured to connect to the service information module in the communication system to access services. The service information module generating a unique service or session and user key and provide this to the communication device and service control client using authenticated and secure means upon receiving a service request from the communication device, wherein the service control client is configured to retrieve the key form the service information module and to send the key to a authenticated and selected service delivery module, wherein the service delivery module is configured to initiate a service delivery session with the service information module using the user authentication and authorization information and key and the service request and to deliver at least one service to the presentation device based on the service request.

The methods and systems according to the present invention are advantageous in that they provides for authenticated and authorized services to be accessed and delivered through non-authenticated and authorized devices, such as a TV, without additional log-in or authentication procedures. In other words, the present invention provides means for how a service provider can use unauthenticated platforms for service rendering and delivering of secure authenticated service by using e.g. a mobile phone to authenticate the platform peers.

Consequently, the presentation device, such as a TV, may not in itself have to be connected to the service information module, but may only be configured to receive the service via the service delivery module. Consequently, the service, such as video and audio content, does not have to be delivered or streamed via the communication device, such as a mobile phone used for authentication and authorization, to the presentation device, but may be delivered directly to the presentation device. Thus, the delivered service may be optimized, e.g. in terms of resolution of a video service, depending on the presentation device and does not have to be dependent on the preferences/performance of the communication device. Also, the limited resources of the communication device in terms of network connection, battery capacity and processing power is saved and does not introduce a bottle neck in the delivery of the service.

The concept of the present invention allows for combining mobile network technologies for authentication with secure local network authentications to allow service delivery to peering devices such as customer provided equipment (CPE).

The communication device may for example be a mobile telephone, such as a "smart"-phone. The communication device may further be any type of wireless transmit/receive unit, such as mobile subscriber units, pager, personal digital assistance or computer.

In embodiments of the first and second aspects, the communication system is a wireless communication system. Thus, the communication system may comprise a wireless network.

The communication system and the services may also be realized as cloud network and may use an open network such as Internet for service access.

In embodiments of the first and second aspects, the presentation device is also connected to the communication system.

Thus, the presentation device may be wirelessly connected to the communication system, such that the service may be wirelessly delivered to the presentation device. However, the presentation device may also be connected via cable to e.g. the service delivery module.

As an example, the presentation device may be a TV, such as a smart TV.

Further, the presentation device may be customer provided equipment (CPE) with capacity to consume or render the service.

A CPE refers to equipment located at e.g. a within a subscriber's premises and connected to the demarcation point ("demarc"). The demarc is the connection at which the public switched telephone network or broad band network ends and connects with the subscribers/customers distribution infrastructure, such as a Local area network (LAN).

A CPE generally refers to devices such as telephones, routers, switches, residential gateways (RG), set-top boxes, game consoles, computers, fixed mobile convergence products, home networking adaptors and internet access gateways that enable consumers to access services and distribute them around their house via a LAN (Local Access Network).

The CPE may both be a device purchased by the subscriber and/or provided by the operator or service provider.

A service provider refers to a company or organization that provides the services being own services, partnered, retailed or brooked.

Furthermore, the presentation device may be the communication device. Thus, the service may be delivered to the communication device, such as the telephone, used to authenticate and authorize the user/subscriber. In other words, services may be consumed directly through e.g. the mobile phone.

In embodiments of the first or second aspect, the presentation device is an un-authenticated presentation device. Hence, it is not required that the user/subscriber to the service is authenticated or logged-in via the presentation device for consuming the service.

As an example, the presentation device and the communication device may be connected to the same local fixed or wireless network or Radio-frequency identification (RFID) system.

By having a relation between the communication device and the presentation device, e.g. both being connected to the same local network, further facilitates for the service session, authorized via the communication device, to be transferred to the presentation device. Thus, there may be a spatial condition fulfilled (the devices being connected to the same local network) for the service to be delivered to the presentation device)

Furthermore, the presentation device and the service delivery manager may be connected to the same local network.

Such a network may be realized e.g. by wired connection, secure wireless network, secure virtual network (tunnelling). Such a local area network or private network usually provides integrity to a satisfying level.

In embodiments of the present invention, the service delivery module comprises a microprocessor and network connectivity, such as a router, a media server or a network access server (NAS).

Thus, the service delivery module may function as gateway equipment configured to, in interaction with the communication device, manage the establishment and maintain a service connection to services in the network. The service delivery module may be further configured to handle more than one service session simultaneously.

In embodiments of the present invention, the service information module comprises service front ends.

Service front ends may thus be the services frontend logics in the network.

Further, the service information module may comprise a centralized element functioning as a common communication element for the service front ends in communication with the service delivery module.

The centralized element may thus function as a centralized service, session and user management element that may be used as a common function instead of implementing such functionality within each individual service front end.

As an example, the at least one service may comprise a media service, such as video and audio service, a communication service and/or storage.

In embodiments of the present invention, the authentication and authorization session between the service delivery module and the communication device is performed by means of SIM or PIN-code based authentication. The SIM or PIN code based authentication may be either direct in the sense that a SIM or PIN challenge in the authentication procedure, or indirectly by performing the authentication procedure on a device or platform that has is SIM or PIN code authenticated with the service provider network while the authentication session between the authenticated communication device and the service delivery module uses another authentication method with satisfying integrity and security.

A personal identification number (PIN), refers to a numeric password shared between a user and the communication device that can be used to authenticate the user.

The SIM (subscriber identification module) of the communication device, e.g. the integrated SIM-circuit of a mobile phone, that stores the International Mobile Subscriber Identity (IMSI) and related key/password used to identify and authenticate the user of the communication device, may also be used for authentication and authorization. The authentication may include a step including a SIM card PIN-code challenge, i.e. a procedure where the SIM card is authenticated to the mobile network. The SIM may be embedded in the SIM card, which is for storing network-specific information used to authenticate and identify subscribers on the network.

The authentication procedure may differ depending on the specific account type. According to the present invention, a non-exhaustive list of account types includes administrator, owner/billing, user, and guest. Further the authentication procedure may also differ depending on the specific service that has been authorized. It may also be based on policies and preferences set by the owner/billing or administrator account.

While some authentication and authorization sequences may use a strong method, a method with a high security level, combining multiple steps, other may only include one or a few steps, which may be only a software login or using stored keys (service unique or to the network) in the client. An example is to authenticate and authorize a user based on that he/she is authenticated on the same local network (e.g. WLAN) and has a known identity.

In embodiments of the present invention, the method is further comprising linking the authentication and authorization information to billing mechanisms for the at least one service.

According to embodiments of the present invention, the authentication may be for one particular transaction or session, or the SDM may be provided with a authenticated key that are valid for a defined number of transactions or for a defined time (e.g. 4 hours or 30 days). Details of the validity and how to use the credentials are provided to the SDM from the SCC.

A service may also be initiated or controlled by another device, e.g. a PC with a browser connected to the SDM but not using a SCC, if so is allowed by the service policies. If so, authentication of service or particular content or functionality within the service, may initiate authentication procedure with the SCC that has the authorities to approve the request, typically being the owner or billing account of the service. An example is a video service initiated from a browser or a TV, but where the request to the policy function or directly to the video server triggers an authentication message to the service account owner typically, but not necessary, on an authenticated communication mean such as SMS.

The billing mechanisms may for example be credit card numbers, subscription with service provider, internet payment account etc. Thus, the information used for authentication and authorization may also be used by the service provider for automatically billing the user/subscriber of the service. Thus, no further identification or billing procedures may be needed for delivering the service to the user. As an example, a billing relation between a mobile network operator or a mobile virtual network operator may be used for billing of the services. This relation may also be used if the service is transferred from one presentation device to another.

In embodiments of the present invention, the method comprises presenting available service presentation devices for the communication device.

As an example, after authentication and authorization, the service delivery module may present information to the communication device about available presentation devices. The user of the communication device may then select which device the service is to be delivered to, or this is automatically selected by previously configured preferences.

The method of the present invention may further comprise transferring the stream of the at least one service to another presentation device based on a further service request from the communication device.

Thus, this allows the user of the communication device to transfer e.g. video, audio or communication session or content, or access to a cloud storage service, from one presentation device to another, e.g. from one TV to another or from the TV to the mobile phone or vice versa. The method and system of the present invention facilitates seamless handover of services between devices, also when one or more of the devices are unauthenticated to the service provider.

In embodiments of the present invention, the method comprises adapting the at least one service before delivery to the at least one presentation device based on the service rendering capabilities of the presentation device.

As an example, the service delivery module may adapt the service depending on the selected presentation device, e.g. by incorporating information about rendering capabilities of the selected presentation device in the service request to the service information module. Consequently, the service may be optimized for the presentation device selected by the user.

In embodiments of the present invention, detecting a service delivery module is preceded by searching for available service delivery modules.

Thus, the communication device implementing the SCC may perform a continuous search, or a search according to Service Provider instructions, for available delivery modules. When a SCC equipped communication device detects a new SDM, a procedure may be started where either a new owner and billing account is created in the SDM if there is no such account exists, or another account type is created.

According to embodiments of the present invention, new accounts may be user accounts (permanent accounts of e.g. family members or other users that are allowed to use the provisioned services) or guest accounts (temporary accounts that have restricted access to services but who may also have own services that can be rendered using the SDM).

A non-exhaustive list of example account types include:

Admin: Administrator account where preferences of the SDM and attached devices are managed Owner/Billing account: Account that manages services provided by the Service Provider that are billed for and sets policies for how these services may be used by Users and Guests.

User: Authenticated accounts used for consuming services

Guest: Account valid for a configurable period with typically limited access to the services of the Owner, but also access to his own services to the extent defined by policies set by Owner.

In other embodiments of the present invention, the communication device has not previously been authorized to use the service delivery module.

As an example, the authentication and authorization session between the service delivery module and the communication device may then comprise initiating a guest mode session between the service delivery module and the communication device, wherein the guest mode comprises receiving authorization information from the owner of the service delivery module. A Guest may use the visiting SDM to consume and present services associated with this account with the Service Provider, but also via the visiting SDM create a connection on his own SDM.

Thus, there may be a procedure involving the owner of e.g. a secure local network to which the presentation device is connected before the communication device discovers the SDM and becomes authorized to consume the services using the presentation device Furthermore, in embodiments of the first and second aspect, user authentication and authorization between the communication device and the service delivery module is the same as, or re-uses indirectly, the user authentication and authorization between the communication device and a mobile network in which the communication device is configured to operate.

Thus, the authentication and authorization of the communication device to the mobile network may be used for authentication with the service delivery module as the service provider may use the authenticated means to communicate with the communication device implementing the SCC to deliver authentication details to use when authentication the SDM. This means that the trusted PIN or SIM authentication used for the mobile network connection between e.g. a mobile phone and a network operator may be used for authentication and authorization with the service delivery module by having the following authentication and authorization procedure implemented on a connection that is authenticated (e.g. by using SMS).

The service delivery module may have the same owner as the mobile network.

In embodiments of the first and second aspect of the invention, the service request comprises a service key comprising user data, session identification and/or session information.

The user data may for example comprise service accounts associated with the mobile device The session information may for example comprise where to start in the stream, preferences of the video or audio etc.

In embodiments of the first and second aspect of the invention, the service request comprises service location and/or the address to the service information module.

The location and/or address may be an internet location, e.g. comprising an URL that constitutes a reference to an internet resource from which services may be reached.

The service request from the communication device to the service information module may be provided by the communication device directly, or may be provided via the service delivery module.

Further objects and advantages of the present invention will be discussed below by means of exemplifying embodiments.

These and other features, aspects and advantages of the invention will be more fully understood when considered with respect to the following detailed description, appended embodiments and accompanying drawings.

BRIEF DESCRIPTION OF THE DRAWINGS

The drawings are not necessarily drawn to scale and illustrate generally, by way of example, but no way of limitation, various embodiments of the present invention. Thus, exemplifying embodiments of the invention are illustrated by way of example and not by way of limitation in the figures of the accompanying drawings in which like references indicate similar elements. It should be noted that references to "an" or "one" embodiment in this discussion are not necessarily to the same embodiment, and such references mean at least one.

DETAILED DESCRIPTION OF THE INVENTION

As used herein, the term "module" refers to an application specific integrated circuit (ASIC), an electronic circuit, a processor (shared, dedicated, or group) or memory that execute one or more software programs, a combinational logic circuit, or other suitable components that provide the described functionality. The term "module" may further refer to a specific form of software necessary to practice the methods described herein and particularly the functions described in connection with each specific "module". It is believed that the particular form of software will be determined primarily by the particular system architecture employed in the device and by the particular detection and therapy delivery methodologies employed by the device. Providing software to accomplish the described functionality in the context of any modern communication device, given the disclosure herein, is within the abilities of the person skilled within the art.

Method Overview

Figure 2:
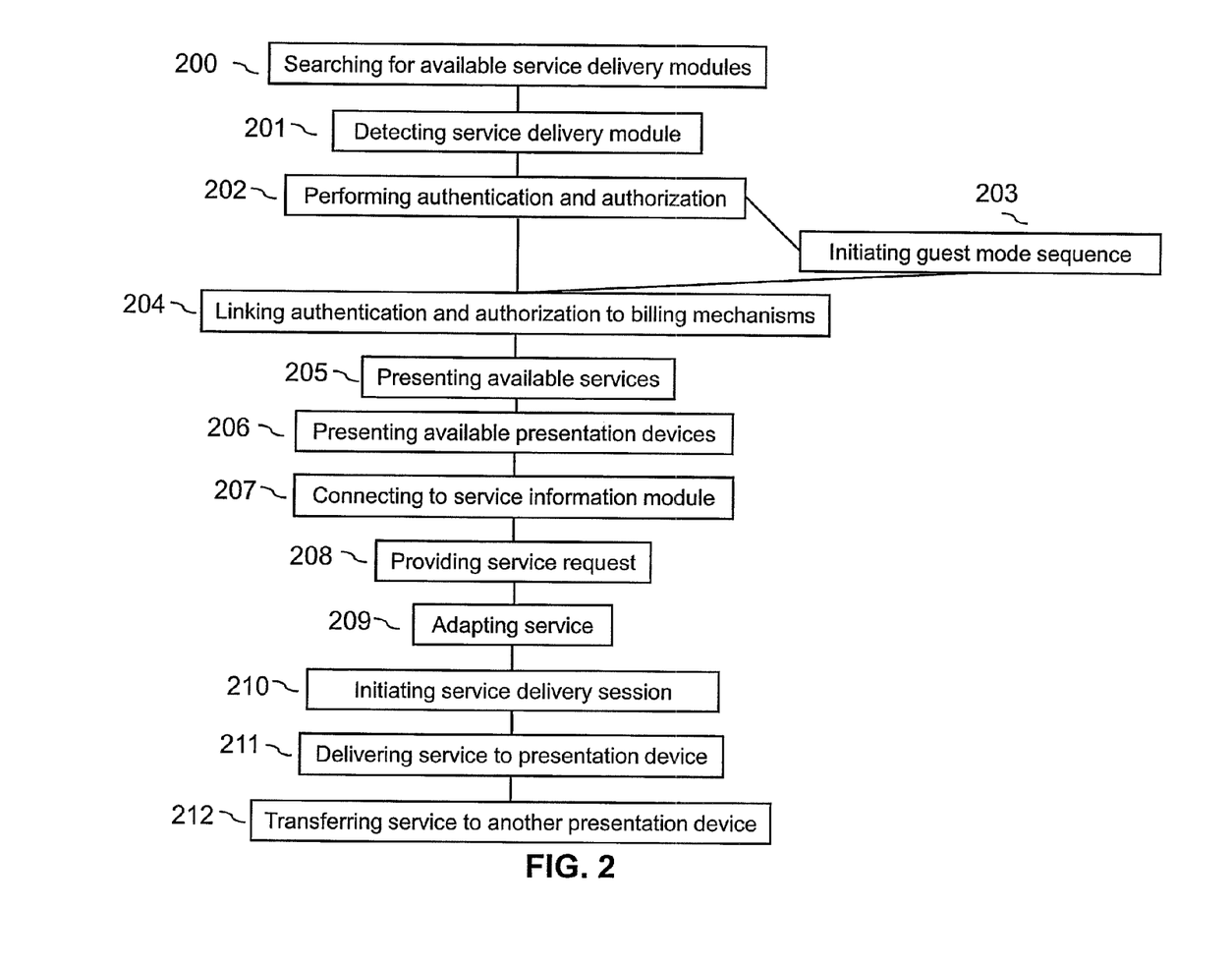
FIG. 2 shows an overview of the method for delivering a service to a presentation device.

FIG. 2 shows an overview of the steps that may be performed within the communication system. It is to be understood that the steps do not necessarily have to be performed in the order presented in FIG. 2. A communication device, such as a mobile phone, may search 200 for any available service delivery modules and e.g. when in a specific area or range from a module, detect 201 such a service delivery module. An authentication and authorization session is initiated and performed 202 between the communication device and the service delivery module, which may involve the user of the communication device to enter e.g. a PIN code, a password or exchanging credentials stored in the communication device or provided without need of customer interaction form the service provider. Such a session may be initiated either from the delivery module or from the communication device. If the SDM is a SDM with yet no owner account created, this will be performed typically initiated by the communication device implementing the SCC. Once the user/subscriber has been authenticated, billing mechanisms may be linked 204 to the specific user or communication device. If the communication device is previously unknown to the delivery module while the delivery module already has provisioned owner/billing account and the new SCC is a client added as a user account, a guest session may be initiated 203, which e.g. may require further authorization from the owner account of the delivery module or/and the owner of the wireless network in which the delivery module operates before any service sessions are initiated.

Available services, typically being the services provided by the service provider, may be presented 205 to the user in the communication device implementing the SCC. Services may also be presented to device connected directly with the SDM, e.g. in a browser, if it is services that is available to consume or initiate from other devices than the device implementing the SCC. Further, available presentation devices may be presented 206 to the user. Services and presentation modules may be presented by the delivery module for the communication device. As an example, a list of available media services and available TV:s, music equipment, game consoles or other presentation devices may be presented for the user on the mobile phone, and the user may then select the suitable presentation device to which service is to be delivered.

The service delivery module and/or the communication device may then connect 207 to a service information module, realised e.g. in a server or a cloud network. A service request containing e.g. type of service and service location as well as information used to associate the request with the user and eventual session or accounts if needed is provided 208 to the service information module. The service may then be adapted 209 depending e.g. on user input and the rendering capabilities of the selected presentation device. As an example, the resolution of a video service may be adapted depending on the selected presentation device.

A service delivery session is then initiated 210 between the service information module and the service delivery module, and the service is delivered 211 to the selected presentation device.

As a response to e.g. input from the user, the service stream may be transferred to another presentation device, e.g. transferred 212 from one TV to another.

System Components and Software

Figure 1:
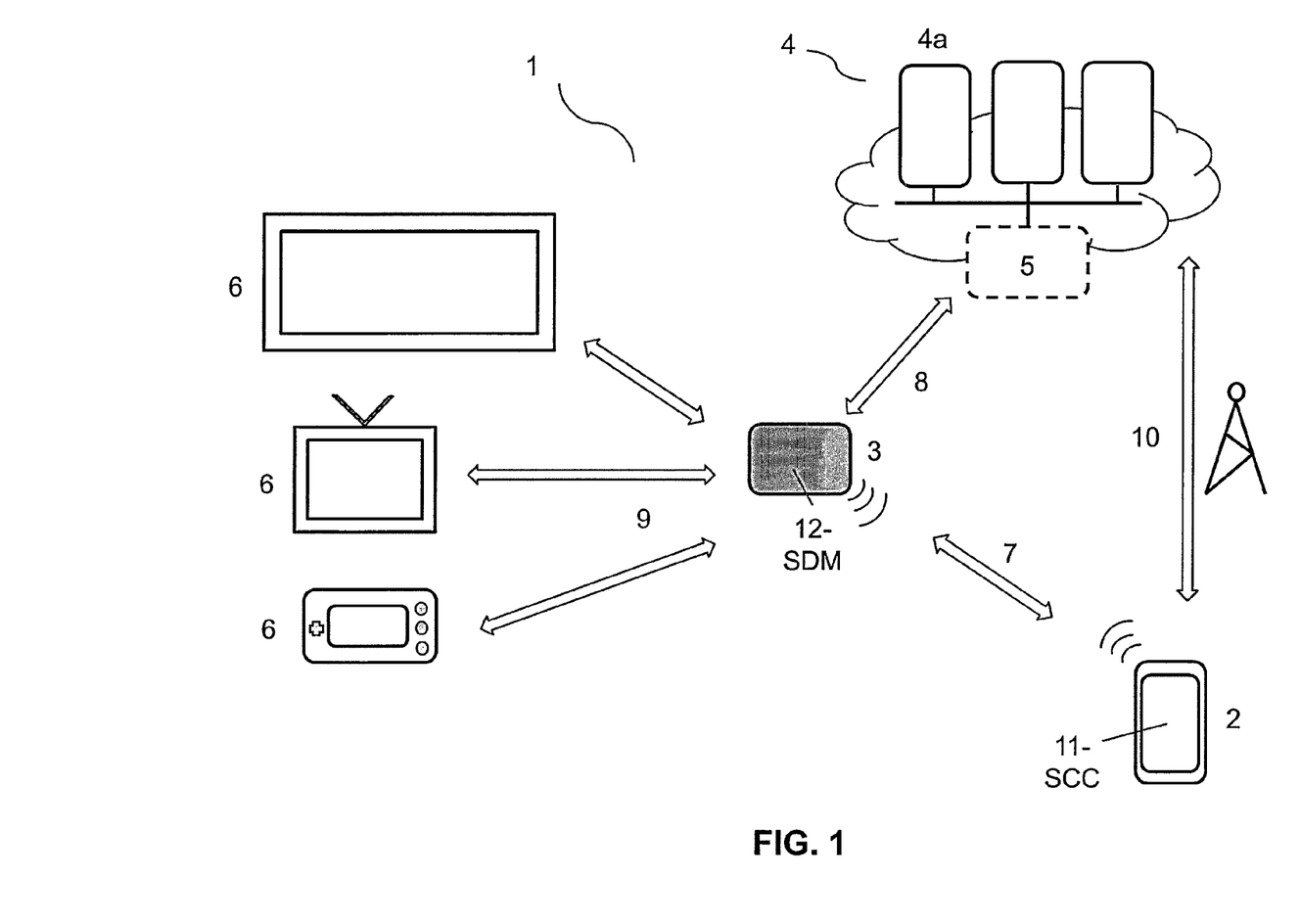
FIG. 1 shows a schematic drawing of a communication system.

One of the fundamental ideas is that a communication device, e.g. a customer's mobile phone, is the primary interaction device is set up or initiated, authenticated and authorized. A system for realising the method is schematically shown in FIG. 1.

The communication system 1 has a number of main functional components that may entirely be controlled by or with software components controlled by the service provider. Functionalities in the components of the communication system 1 may be centralized and implemented in stand-alone, possibly shared, network elements.

A communication device 2, such as a smart phone with a SIM authenticated unit, representing the users authenticated and authorized relation with the mobile network (or mobile virtual network operator) operator. The mobile network operator may be the same or partner with the provider of the services as well as the platform where services can and are interacted with through web interfaces. The communication device 2 is thus the mobile device where the user is authenticated and authorized to services.

The service delivery module 3 is a service gateway equipment including software configured to, in interaction with communication device 2, manage the establishment and maintain a service connection to the service(s) in the network. The service delivery module 3 may be implemented in a router, media server, computer, game console, NAS or other device with microprocessor and network connectivity capable of meaning one or multiple connections and sessions as well as the service delivery manager software.

The services are realised in a service information module 4. 4*a* is the services frontend logics in the network, which may be e.g. content and media services (video, music, web), communication services, storage. The service information module may further comprises a centralized element 5, which function as a centralized service, session and user management element that may be used as a common function instead of implemented such functionality within each individual service front end 4*a*.

The service information module 4 may thus be or function as a server representing the service provider own service infrastructure (typically a cloud service) of own application servers and front ends or front ends by partner provided services and applications.

Presentation devices 6 are equipment connected to the network and used to render one or multiple services realized in the network ("cloud"). One or several of the presentation devices 6 may be a CPE that are to some extension known and recognized by the service delivery manager and presented as presentation options to the SCC and the application used to control it in the communication device, e.g. the mobile phone.

In addition to the system components described above, there are multiple networks and network elements, and various networks connecting the components with each other and internet.

9 represents a network connection to the presentation devices 6 used to consume/render the services provided via the service delivery module 3. This network connection is typically a Local Area or Private Network that provides integrity to a relevant level. This can be either as result of physical availability e.g. wired connections, a secure wireless network connection or a secure virtual network connection (tunneling) or a combination of those.

The connection between the communication device 2 and the service delivery module is represented by 7. This is usually a secure, trusted connection with high integrity.

The mobile network connection to the service information module 4, e.g. an application server, is represented by 10. This connection is generally authenticated and trusted.

The interface from the service delivery module 3 and the service information module 4 is represented by 8. This data connection is typically a secure connection or encrypted stream, but possibly over an open network such as internet.

The service delivery module 3 may include an SDM 12 ("Service Delivery Manager") configured to, in interaction with communication device 2, manage the establishment and maintain a service connection to the service(s) in the network 1. The SDM 12 may be implemented as a software. The SDM 12 may further control the delivery of service related data, i.e. by controlling connection 8. Furthermore, the communication device 2 comprises an SCC ("Service Control Client") 11 that communicates with the SDM 12 in the service delivery module 6 as well as with the services and applications front end servers 4. The SCC 11 may be implemented as a software.

The SDM 12 and SCC 11 software may function as follows:

The SCC is a the client implemented in a platform providing sufficient authentication and authorization means for the service provider to provide services that typically are associated with an billing account. The SCC authenticates and authorizes the user with services provided by the service provider according to service and user based policies typically depending on the agreement between the user and the service provider. The SCC hence constitutes the primary mean for how the customer interacts with the services when the interaction requires authentication of the user.

The SDM in the service delivery module 3 publishes its existence to the local network and/or other selected destinations on the network or Internet. The publishing may be public or to selected mobile devices and clients, and possibly a combination. How and to whish the Service Delivery Manager is published is controlled by the Service Provider. When detected, the SDM 12 is invoked by the SCC 11 and an authentication and authorization between the SDM and SCC 11 in order to establish a connection and associate the SCC with an account in the SDM. When the SCC 11 is authorized, the SDM 12 publishes local service rendering capabilities (such as audio and video devices, storage etc.) that can be used for service delivery. The SDM 12 also establishes the connection to the service front ends 4, where information about the SCC 11 and SCC 11 user is provided as well as service information and preferences based on the local service rendering capabilities, which may be used to adapt the service.

As discussed above, the SCC 11 is the connection between a customer's authenticated and authorized (typically SIM/MSISDN-based or indirectly SIM/MSISDN based) service accounts (available services, billing details etc.) and related or connected SDM:s 12 or service delivery modules 3. The SCC 11 tries to find and connect to service delivery modules 3 continuously or according to Service Provider instructions and configurations (e.g. by always looking for a local service on all or certain networks).

When detecting a new or already known service delivery module 3 (e.g. by attaching a local network where a service delivery module 3 is publishing its existence via the SDM software 12, or by getting instructions by the user or Service Provider to connect to particular service delivery module 3), the SCC 11 attempts to establish a connection with the SDM 12. A authentication and authorization procedure is initiated, in which capabilities of available services or presentation devices 6 is presented to the SCC 11 based on Service Provider and user (both SCC 11 and SMS user/owner, which may not be the same).

The SCC 11 may now order SDM 12 to perform a service initialization, set-up or modification based on customer interaction with the SCC 11 or by settings and preferences controlled by the user or Service Provider. The SDM 12 may be fully unaware of whom the user of the SCC 11 is (e.g. meaning that no used details provisioning is performed in the SDM prior to interacting with the SCC) and the service he is attempting to render.

The service frontend 4*a* serves the customer with service sessions and streams to one or multiple network destinations. The session or stream is typically terminated in the mobile device or in the service delivery module 3

The service front end uses shared secret principles negotiated between the SCC 11 and service frontend to authenticate service and to identify session.

Upon the request from a SCC to prepare to deliver to deliver the service to a SDM, a unique key is generated for the particular SCC user, service and session is generated. The request may include SDM identity information, if such policies are applied. This key is, among other information, used by the SDM in the service request and is used to associate the particular SDM and SDM request with a SCC user that means a customer, in order to manage policies and billing of the delivered service.

The service frontend 4*a* delivers the service to the destination requesting the service, or may in some cases deliver it to a destination being instructed to deliver it to.

Thus, the SCC 11 installed in a user's communication device (e.g. a smart phone) authenticates and authorizes with the users available services provided by or through the service provider. Several SCC 11:s may share the same service accounts (e.g. a family) and how charges for service is booked on the customer accounts and bills. This may be managed by having a super user of the SCC 11 (e.g. the MSISDN/Mobile Account owner) who can add additional MSISDNs/Mobile accounts as users. Services may be consumed directly thought the mobile device (e.g. a streaming video or audio service) or through other rendering alternatives using the SCC 11 and an SDM 12.

To summarize, the method and system allows a user to use a mobile phone with a service control client, communicating with a device embedded soft ware in un-authenticated connected devices, to authenticate and authorize set-up, initialization or modification of service session and apply business rules accordingly.

Detailed Flow Chart

Figure 3:
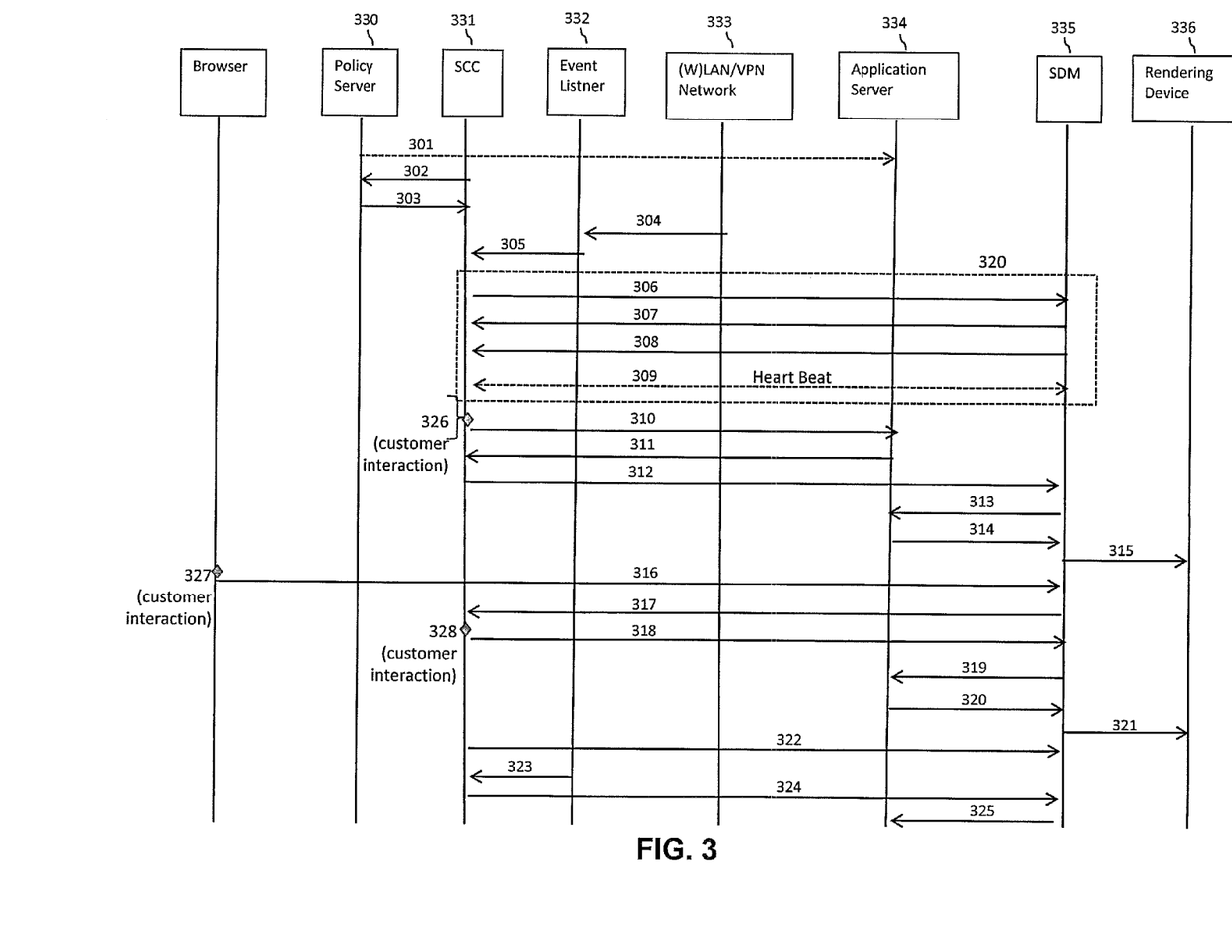
FIG. 3 shows a detailed overview of how signalling may be performed in the communication system.

FIG. 3 shows a detailed flowchart of an example of how signals/information may be transferred between components in the communication system. In this, example, there is a policy server 330, the SCC software 331 integrated in the communication device, an event listener 332 within the communication device, a network (a (W)LAN/VPN network) 333, a service information module in the form of an application server 334, the SDM software 335 integrated in the service delivery module and the presentation device/rendering device 336. The method may be implemented as follows. That is, the method may comprise one or several of the following steps:

301: Policy server 330 sets policies in Application Server 334, both general and user specific policies;

302: SCC 331, typically running on mobile device, contacts Policy Server 330 to get policies, general and user and service specific, to apply

303: Policy Server 303 sets SCC Policies;

304: The WLAN network pilot detected by the communication device;

305: Event Manager in OS or part of the SCC software (depending on platform) alerts the SCC 331 that an event that shall trigger search for SDM has occurred, such as a new WLAN network is discovered and/or attached to;

306: SCC 331 attempts to contact a local SDM 335 e.g. by querying a local routed URL;

307: SDM 335 returns it's Presence as well as authentication information

308: Authentication (customer account and service authentication and authorization) and session establishment as well as SDM 335 provides local properties to SCC 331, such as available presentation/rendering devices;

309: A "Heart Beat function" used to continually (to step 319) confirm the existence of the SCC 331. Policies for Heart Beat (e.g. frequency) and actions if lost is set in 308. The SCC-SDM Link establishment is depicted by dotted 320 in FIG. 3;

310: SCC 331 contacts application server 334 to prepare for service session to be established to SDM 335 and to get the key later used for association;

311: Application Server 335 returns authentication details;

312: SCC 331 provide service details (e.g. address to application server), session details and authentication details as well as information provided by user interaction to the SDM 335;

313: SDM 335 establishes session with application server 335 with details provided in 312 in order to associate request with SCC customer/account as well as details needed for service rendering (e.g. resolution, bit rate and/or other quality parameters);

314: Application server 334 initiates delivery of service;

315: SDM 335 creates local network service rendering session, e.g. using DLNA to deliver media stream to rendering device 336;

316: Interaction with service from a non-SCC device, such as a device running a browser communication directly with service controller in or with reference to the SDM modules service, e.g. changes the content that is being streamed;

317: An action that requires SCC approval (defined by policies previously provisioned) that requires approval by a SCC (e.g. if there are additional billing to be applied or if it is a content that requires approval), triggers the SDM to send Approval message to SCC;

318: Approval (alt. Not Approval) message sent to SDM, if Approval Message is sent, prior to the message sent to SDM the sequence 310 and 311 may be executed with new service details in order to get a new key to update session with;

319: SDM contacts Application Server 334 to get update or start new service session (e.g. new content stream);

320: Application Server 334 updates session to SDM;

321: SDM 335 updates or creates new local network service rendering session;

322: SDM 335 notifies SCC 331 that service is established and being rendered, so that SCC 331 may change mode to a controller mode;

323: Event Listener 332 alerts SCC 331 that an event has taken place, which may be a reason to change the service session in the SDM 335 (e.g. terminate it or "move" it to another rendering device 336, such as to the mobile device);

324: SCC 331 orders SDM 335 to take action according to policies and/or user instruction;

325: SDM 335 takes action with application server 336.

Thus, the present method may only require a single customer authentication and authorization interaction, e.g. before step 310 as depicted by 325 in FIG. 3. In 327 the customer, or another user, uses a non SCC device to change the service, e.g. using a non Service Provider authenticated device in the local network that via the SDM can manage a set of services by directly interact with the SDM. The Customer Interaction in step 328 is if the interaction in step 327 requires the authorized service account SCC to approve the change (e.g. if there are business logic associated with the change).

Implementation Scenario—Video on Demand on TV Via Mobile Phone

The following implementation scenario example further illustrates the interplay between communication device and service delivery module, i.e. interplay between the SCC and SDM software. The scenario and technical description is described in relation to FIG. 1.

Scenario example: A user is at home and there are two TV:s connected to the local network in the home. The user wishes to use the VOD service on his phone. After selecting the movie and pressing Play on the mobile device, a menu is displayed asking the user if the content shall be played out in mobile or on TV. User selects TV, and a list of available TV:s are presented. User selects "Living room TV". The movie is started on the TV, and the phone interface is transformed to a remote control.

Technical description/solution: The users has a VOD service account associated with the mobile subscription (SIM-card). After successfully authenticated himself with the PIN-code when starting the phone 2, the user can use the service and content is billed for without any additional authentication procedures.

Within the service (e.g. App or HTML5 code) there is a SCC 11 that will start listen for local SDM(s) 12 that is available. If there is a known SDM 12 detected (a SDM 12 where the user/SCC 11 is already authorized to use) the service will register this and at certain events in the service acquisition flow present the customer options based on the SDM:s 12 capabilities and the users (the SCC 11) preferences and rights. If there is a SDM 12 detected that is not known, the SDM 12 is registered as a visiting SDN and the SCC 11 will act in guest mode, which means there will be a procedure involving the local network/SDN owner before presenting the capabilities.

In this example, the network has two TV:s 6 configured, one being the "Kids Room" and one being the "Living Room". The SDN also have some preferences of each TV, saying that the "Living Room" TV supports 1080P resolution, while the "Kids Room" is a 720P TV.

When the user are in the same network with an SDN being authorized to use and using the VOD or TV service, in the user interface on the mobile phone option to present the content on a TV instead.

User selects TV when being presented the option, and then a new question follows asking which TV. User selects "Living Room".

The SCC 11 now generates a unique service key combining User Data, Session Identification, Session Information (where in the stream to start, e.g. beginning or 21 minutes from start etc.). The SCC 11 also includes the preferences of the video, in this case 1080P resolution and possibly audio quality preferences, in the key (notes that some of this information or additional information may be added by the SDM 12).

The SCC 11 also provides the SDM 12 with the Service Location (e.g. an Internet URL or IP address and/or port number) or the address to a centralized service front end 4a.

The SDM 12 sends the request to the provided address, and includes the service key. The Service Frontend 4a (or centralized service front end 5) uses the key to associate the requesting SDM 12 with an service session, and indirectly with both user information used for authentication and billing and session information used for session re-establishment.

A new session is set up to the SDM 12, and the SDM 12 host device establishes the relevant services in order to deliver the service to the requested presentation device. Typically for VOD this is a streaming or progressive download session using DLNA between the SDM host and the TV or Media Player connected to the network.

Figure 4:
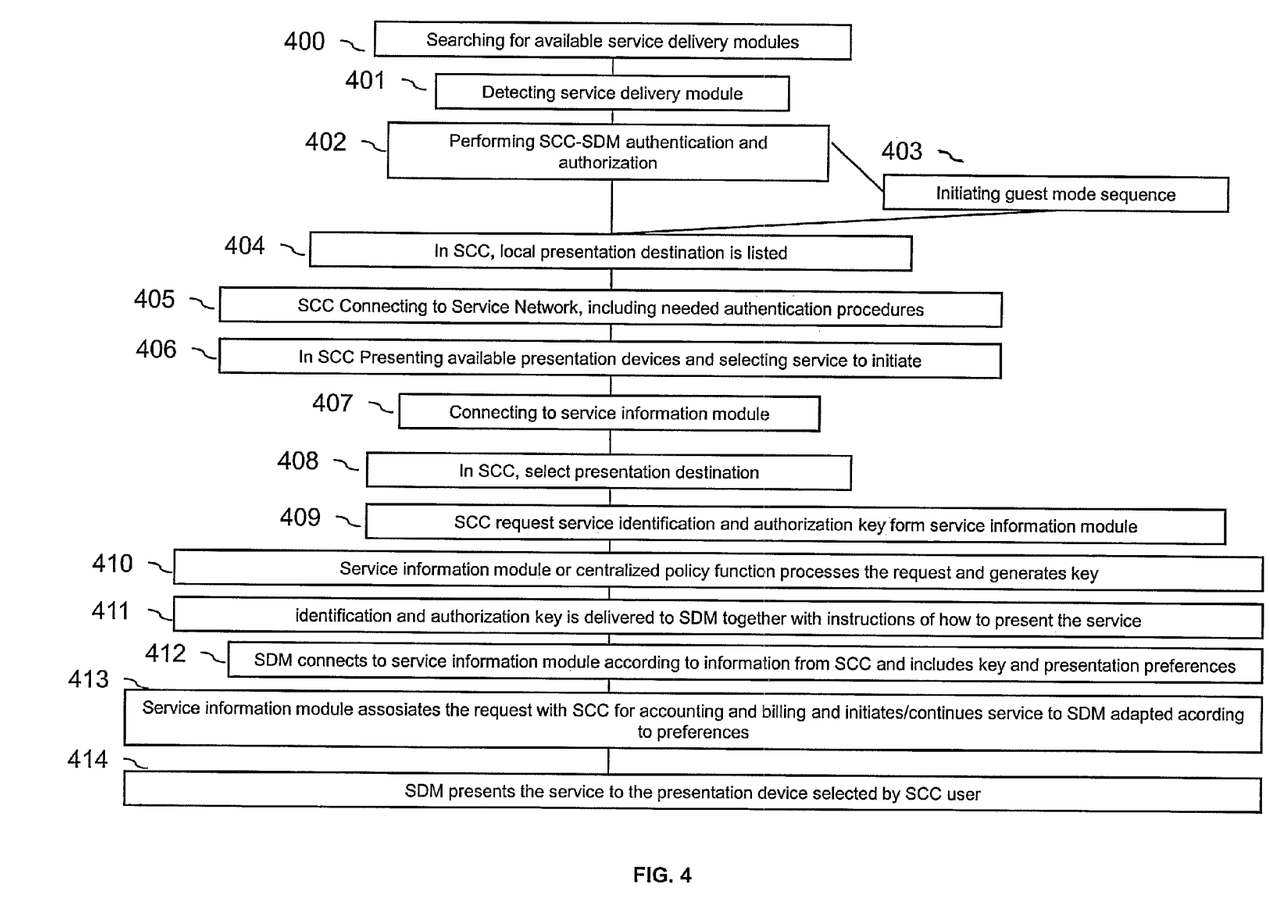
FIG. 4 shows an overview of an embodiment of the method for delivering a service to a presentation device

Turning now to FIG. 4, an embodiment of the method will be discussed. First, in step 400, the service control client (SCC) 11 searches for available service delivery modules (SDM) 12. At step 401, a SDM 12 is detected. In step 402, a SCC-SDM authentication and authorization is performed. Then, in step 403, a guest mode sequence is initiated. Thereafter, in step 404, a local presentation destination is listed in the SCC 11. At step 405, the SCC 11 connects to a service network, which also includes required authentication procedures. Then, at step 406, the available presentation devices 6 are presented by the SCC 11, for example, on a display of the communication device 2 and the selected service is initiated. At step 407, a connection between the SCC 11 and the SDM is established. At step 408, a presentation destination is selected. At step 409, the SCC 11 requests a service identification and authorization key from SDM 12. The service information module 4 or a centralized policy function processes the request and generates the requested key at step 410 At step 411, the identification and authorization key is delivered to the SDM 12. The SDM 12 connects to the service information module 4 according to information from SCC 11 and includes key and presentation preferences at step 412. At step 413, the service information module 4 associates the request with SCC 11 for accounting and billing and initiates/continues service to SDM 12 adapted according to preferences. At step 414, the SDM 11 presents the service to the presentation device 6 selected by the SCC 11.

While this specification contains a number of specific embodiments, these should not be construed as limitation to the scope of the present invention or of what may be claimed, but rather as descriptions of features specific to exemplary implementations of the present invention. Certain features that are described in this specification in the context of separate implementations can also be implemented in combinations in a single implementation. Conversely, various features that are described in the context of a single implementation can also be implemented in multiple implementations separately or in any suitable sub-combination. Moreover, although feature may be described above as acting in certain combinations or even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as require such operations be performed in the particular order shown or in sequential order, or that all illustrated operation be performed to achieve desirable results. In certain circumstances, multitasking and parallel processing may be advantageous. Moreover, the separation of various system components in the implementation described above should not be understood as requiring such separation in all implementations, and it should be understood that the described program components and systems can generally be integrated together in a single software product or packaged into multiple software products.

The invention claimed is:

1. A method for providing services to a presentation device, said method comprising
    detecting a service delivery module in a communication system using a communication device comprising a service control client;
    performing an authentication and authorization session between the service delivery module and the communication device, wherein user authentication and authorization is created;
    connecting to a service information module server in said communication system to access services;
    providing the service control client that is authenticated and authorized of one or multiple services from the service information module server;
    providing a service request from said communication device to said service information module server;
    said service information module server generating a unique service or session and user key and providing this to said communication device and service control client using authenticated and secure means;
    said service control client comprised in said communication device retrieving the key from said service information module server and sending the key to an authenticated and selected service delivery module;
    said service delivery module initiating a service delivery session with said service information module server using said user authentication and authorization information and key and said service request; and
    delivering at least one service to said presentation device based on said service request,
    wherein said communication device has not previously been authorized to use said service delivery module,
    wherein said authentication and authorization session between the service delivery module and the communication device comprises
        initiating a guest mode session between the service delivery module and the communication device, wherein the guest mode session comprises receiving authorization information of an owner of the service delivery module.

2. The method according to claim 1, wherein the authentication and authorization session between the service delivery module and the communication device is performed by means of SIM or PIN-code based authentication.

3. The method according to claim 2, further comprising linking the authentication and authorization information to billing mechanisms for the at least one service.

4. The method according to claim 1, further comprising linking the authentication and authorization information to billing mechanisms for at least one service.

5. The method according to claim 1, further comprising linking the authentication and authorization information to billing mechanisms for the at least one service.

6. The method according to claim 1, further comprising presenting available service presentation devices for said communication device.

7. The method according to claim 1, further comprising presenting available service presentation devices for said communication device.

8. The method according to claim 1, further comprising transferring the stream of said at least one service to another presentation device based on a further service request from said communication device.

9. The method according to claim 1, further comprising transferring the stream of said at least one service to another presentation device based on a further service request from said communication device.

10. The method according to claim 1, further comprising adapting the at least one service before deliver to the at least one presentation device based on the service rendering capability of the presentation device.

11. The method according to claim 1, further comprising adapting the at least one service before delivery to the at least one presentation device based on the service rendering capabilities of the presentation device.

12. The method according to claim 1, wherein detecting a service delivery module is preceded by
    searching for available service delivery modules.

13. The method according to claim 1, wherein said communication device has previously been authorized to use said service delivery module.

14. The method according to claim 1, wherein the communication system is a wireless communication system.

15. The method according to claim 1, wherein the presentation device is a wireless communication system.

16. The method according to claim 1, wherein said presentation device is a customer provided equipment (CPE) with capacity to consume or render said service.

17. The method according to claim 1, wherein said presentation device and the communication device.

18. The method according to claim 1, wherein said presentation device is an un-authenticated presentation device.

19. The method according to claim 1, wherein the presentation device and the communication device are connected to the same local network or Radio-frequency identification (RFID) system.

20. The method according to claim 1, wherein the said presentation device and said service delivery manager are connected to the same local network.

21. The method according to claim 1, wherein user authentication and authorization between the communication device and the service delivery module is the same as the user authentication and authorization between the communication device and a mobile network in which the communication device is configured to operate.

22. The method according to claim 1, wherein the service deliver module comprises a microprocessor and a network connectivity, such as a router, a media server or a network access server (NAS).

23. The method according to claim 1, wherein the service information module comprises service front ends.

24. The method according to claim 23, wherein the service information module further comprises a centralized element functioning as a common communication element for said service front ends in communication with said service delivery module.

25. The method according to claim 1, wherein said at least one service comprises a media service, such as video and audio service, a communication service and/or storage.

26. The method according to claim 1, wherein the service request comprises a service key comprising user data, session identification and/or session information.

27. The method according to claim 1, wherein the service request comprises service location and/or the address to said service information module.

28. A system for providing at least one service to a presentation device via a communication system, said system comprising:
   a service delivery module configured to initiate an authentication and authorization session with a communication device and to initiate a service session with a service information module server, the service information module server comprising said at least one service and being configured to deliver said service to at least one presentation device configured to consume or render said service; and
the communication device,
wherein:
   the communication device comprises a service control client that is authenticated and authorized of one or multiple services from the service information module server and configured to detect said service delivery module using the service control client;
   an authentication and authorization session between the service delivery module and the communication device, by which user authentication and authorization is created, is performed;
   the service control client is configured to connect to said service information module server in said communication system to access services;
   said service information module server generates a unique service or session and user key and provides the unique service or session and user key to said communication device and service control client using authenticated and secure means upon receiving a service request from said communication device, wherein said service control client is configured to retrieve the key form said service information module server and to send the key to an authenticated and selected service delivery module; and
   said service delivery module is configured to initiate a service delivery session with said service information module server using said user authentication and authorization information and key and said service request and to deliver at least one service to said presentation device based on said service request,
   said communication device has not previously been authorized to use said service delivery module,
   said authentication and authorization session between the service delivery module and the communication device comprises
      initiating a guest mode session between the service delivery module and the communication device, wherein the guest mode session comprises receiving authorization information of an owner of the service delivery module.

* * * * *